United States Patent [19]

McLaughlin et al.

[11] 4,022,981
[45] May 10, 1977

[54] CONFERENCE CIRCUIT FOR PULSE CODED MODULATED TELEPHONY

[75] Inventors: Donald W. McLaughlin, Bolingbrook; David Q. Lee, Chicago, both of Ill.

[73] Assignee: GTE Automatic Electric Laboratories Incorporated, Northlake, Ill.

[22] Filed: July 28, 1976

[21] Appl. No.: 709,580

[52] U.S. Cl. ............................................. 179/18 BC
[51] Int. Cl.² ............................................. H04M 3/56
[58] Field of Search ................................. 179/18 BC

[56] References Cited

UNITED STATES PATENTS

| | | | |
|---|---|---|---|
| 3,699,264 | 10/1972 | Pitroda | 179/18 BC |
| 3,761,624 | 9/1973 | Lewis et al. | 179/18 BC |
| 3,787,630 | 1/1974 | Carbrey | 179/18 BC |
| 3,796,833 | 3/1974 | Lewis et al. | 179/18 BC |

*Primary Examiner*—William C. Cooper
*Attorney, Agent, or Firm*—Robert J. Black; David W. Heid

[57] ABSTRACT

A method of providing a multi-port conference circuit for use in a telephone switching system employing pulse coded modulated signals for transmission and supervision. Samplings of coded information are employed as a source of conference data and comparison with the digital information contained therein is employed to choose the speaker in a conference group.

5 Claims, 3 Drawing Figures

TIMING CHART

CONFERENCE CIRCUIT

CONFERENCE CIRCUIT FOR PULSE CODED MODULATED TELEPHONY

BACKGROUND OF THE INVENTION

1. Field of the Invention

This invention relates generally to transmission and switching techniques in telephone communication systems and more particularly to a conference technique whereby a number of channels in a telephone switching system employing pulse code modulation for transmission purposes are combined so that a number of subscribers may participate in a common telephone conversation.

The present invention pertains to a conference circuit for use in a private automatic branch exchange similar to those units manufactured by GTE Automatic Electric Incorporated and designated GTD 120. Circuitry with minimum modification could also be employed in Class 5 central offices that employ digital switching. Such telephone systems employ a time switching network rather than the more prevalent earlier space divided switching network.

In time division switching networks a requirement exists to have sources of pulse code modulated voice samples associated with time slots. These time slots allow the conference to sequentially receive the code for each conferee. For the conference circuit to be effective it must be able to recognize who the conferees are and of course who is not associated with the conference. The circuitry must also be capable of distributing the conference speaker's code to each conferee. Information of this sort is of course available in the telephone switching systems referred to above. It should be understood that only telephone switching systems employing pulse code modulation can use the circuitry of the present invention and such circuitry interfaces with time division portions of such switching networks.

2. Description of the Prior Art

In the past, conferencing has generally been done using analog methods. Such methods usually require physical ports or terminations to a conference bridging circuit which then mixes analog signals at constant impedances. The result of such an arrangement is loss of the analog signal which increases as the number of ports increase. Such bridging arrangements usually employ amplifiers to increase the gain back to proper level. For example, a six port conference would have six terminations for lines or trunks which will be connected to the conferencing bridge. A bridge circuit designed for six terminations would then be employed with gain to adjust for the resultant losses. The loss, of course, being the result of six signals terminating on an impedance network to mix all the signals. In such an analog arrangement the signal would then be amplified and sent back to the six conferees.

Disadvantages of analog conferencing systems as outlined above include the cost of the terminations in the system, physical size and cost of the bridge circuitry and the problems resulting from varying levels as the number of conferees change. A variety of schemes for analog circuitry such as direct multiplexing, hybrid repeaters, transistorized analog circuitry, etc. have been utilized. Various solutions to the problem of cross talk, echo loss, impedance matching sidetone, etc. have been disclosed. Some of the techniques employed are shown in U.S. Pat. Nos. 3,116,369, 3,144,518, 3,170,042, and 3,301,962. None of the techniques disclosed in these patents however employ the digital approach and hence have any significance in the field of pulse code modulated telephony.

Another approach to the handling of pulse code modulated information in conference circuitry is taught by U.S. Pat. No. 3,699,264 which is assigned to the same Assignee as the present invention. In the noted patent digital signals are not converted to analog, rather binary words are compared from the participating channels, with the largest binary numbers selected as the speaker. The reference patent however utilizes a maximum binary code to select the speaker, while the technique of the present invention utilizes a minimum binary code as employed in the coding formats (D2 and D3) currently employed in pulse code modulated telephony. Other differences which result in substantial economy of equipment are also included in the present invention. Such improvements will be obvious from the following specification.

SUMMARY OF THE INVENTION

As noted previously, the conference circuit of the present invention is intended for interface with the switching network of a telephone switching system such as that manufactured by GTE Automatic Electric and designated GTD-120. To interface such a network, a special configuration is employed to place the conferees in a conference mode.

The telephone switching network employs a memory having four sections. The sections are: the information memory, which stores pulse code modulation (PCM) code in 8 bits with 96 locations available (0–95), a Control A and a Control B memory each of which store a hold bit plus 7 address bits (also having 96 locations) and a channel memory for storing an 8 bit equipment identity code (also having 96 locations).

The 96 time slots (i.e., address 0–95) result from four groups of 24 channels which corresponds to associated PCM coder and decoder pairs. A third group which is actually a digital tone group uses only 8 of the 24 possible channels. For this reason time slot 94 which is channel 23 (counting 0–23) of group 2 (the digital tone group) is reserved to the conference port. The method of identifying a conferee is to place this address (94) with the hold bit "off" into the associated Control Memory A word location for each conferee. The associated Control Memory B word would have the conferee's own time slot. This allows for that code to be sent to the conference circuit.

The conference than acquires the PCM codes of all conferees each frame during their respective time slots. During the conference time slot (94) a final decision is made as to who is the current (instant) conference speaker (i.e., the speaker for the next frame of 125 milliseconds). The conferees will then be given that PCM code during their respective time slots of the next frame. This is done using a Force Conference lead which controls a conference 2:1 steering gate in the network. The conference circuit then steers the conference speaker's PCM code out of the decoders instead of the conferee's own PCM code. The conference speaker is noted in the conference counter so that when his time slot occurs he is not sent his own PCM code, instead he is sent a "quiet" code.

The procedure followed then is to receive coded voice samples of all conferees during every time frame, choose a speaker and then send the speaker's coded voice sample to all conferees except himself during the next frame. Durint the next frame during which each conferee hears the last frame conference speaker, a new sample speaker is being chosen for the following frame. Thus for every frame a new instant speaker is chosen.

The method for choosing the speaker is to clear the PCM buffers at time slot 94. Then the first conferee detected is loaded to a conferee register. The register is compared to a temporary speaker register. If the conferee code corresponds to a larger pulse amplitude modulated (PAM) sample, (that is it presents a smaller binary value PCM code,) the conferee code is loaded into the temporary speaker register. Each new conferee code is loaded to the conferee register and then compared to the temporary speaker register. If it is larger it is then transferred and becomes the new temporary speaker. If not, it is written over when the next conferee code is loaded in. Finally time slot 94 occurs and the temporary speaker register is transferred to a conference speaker register. This then is the instant conference speaker for the next frame and this register contains the PCM code which all conferees except the speaker himself will receive. It will then be updated one frame later during the next occurrence of time slot 94.

The three PCM registers referenced to above (which are 8 bits wide) have associated 4 bit counters or registers. These count the conferee by determining the number of times time slot 94 is seen in a Control Memory A and it will offer recognition of the conference speaker. Thus every time a conferee's PCM code is loaded into the conference register the conference counter is advanced. The transferring of PCM information to the temporary speaker register also results in storing of the counter information into a temporary speaker counter register. The final transfer of the PCM code in the temporary register to the conference speaker register also results in the transfer of the temporary speaker counter register to the conference speaker counter register. During the next frame, the conferee counter is compared to the conference speaker counter register and if equal the PCM code to the network is switched to a quiet or null code. At time slot 94 after the transfer of PCM information and the count occurs, the temporary counter register is forced to 15 and the temporary speaker PCM register is preset to the null code.

The circuitry of the present invention is implemented using integrated circuits of conventional design. Because of its arrangement and configuration the loss through the conference circuit is fixed and thus is uneffected by the number of conferees.

BRIEF DESCRIPTION OF THE DRAWINGS

FIG. 1 comprises a diagram of the conference circuit; and

FIG. 2 is a diagram of the related portion of a switching system network;

DESCRIPTION OF THE PREFERRED EMBODIMENT

Figure 1:
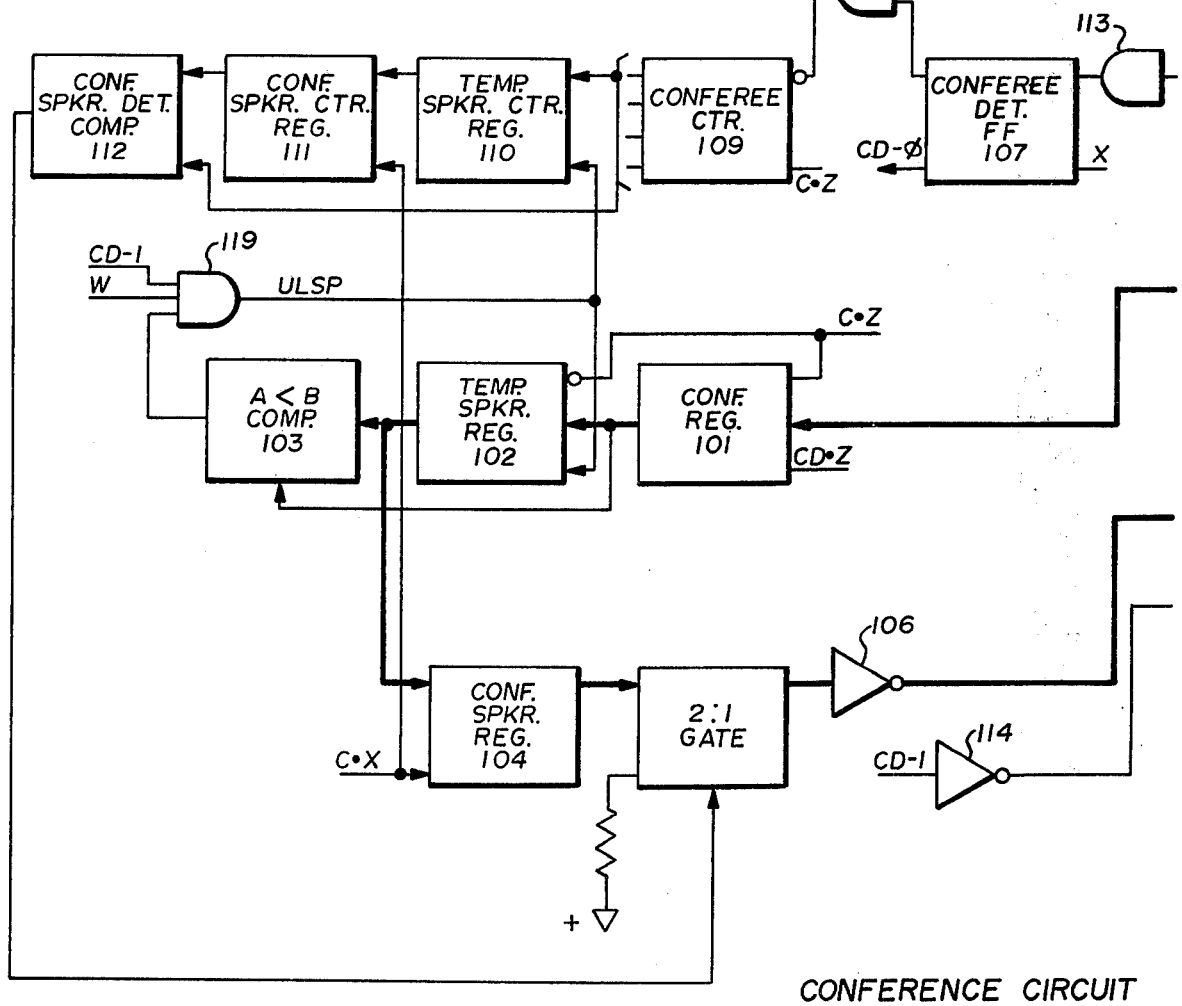
FIGS. 1 and 2 in combination with FIG. 1 placed to the left of FIG. 2 comprise a functional and logic diagram of a conference circuit connected to the switching network of a telephone system employing pulse code modulation.
Figure 2:
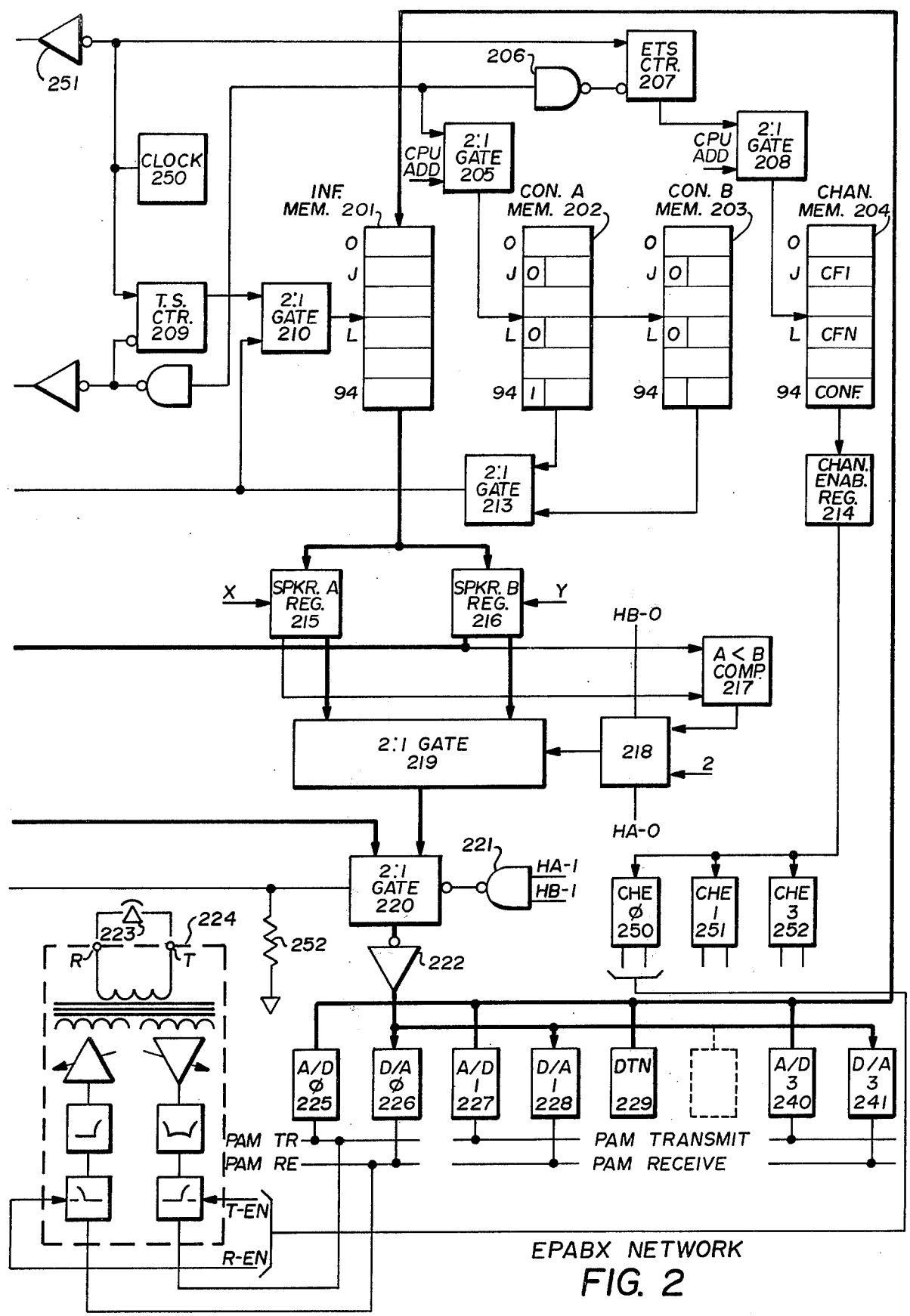

Implementation of the present invention is accomplished by means of circuitry arranged in logic configurations as shown in FIGS. 1 and 2. It should be noted that detailed circuit configurations of such circuitry have not been shown inasmuch as they do not form a portion of the present invention. It is well within the capability of those skilled in the art to implement the required functional circuitry based on the state of the art technology. Commercially available logic circuit is available to facilitate such implementation.

Referring now to FIG. 1 a conference circuit in accordance with the present invention is shown. The conference circuit includes a conference register 101 whose data input is connected to the Speaker B register of the connected telephone switching network, and which is clocked in response to CD·Z pulses and reset in response to C·Z pulses. The data output of this register is connected to the date input of Temporary Speaker register 102 which is also reset in response to C·Z pulses and strobed in response to an Update Loudest Speaker (ULSP) pulse. The data output of this register in turn is connected to the data input of Conference Speaker register 104 whose data output is gated through a 2:1 steering gate 105, the output from gate 105 being transmitted through inverter 106 as the conference PCM-φ signal to the switching network. Register 102 output is also connected to one of the inputs of comparator 103 whose other input is connected to the data output of register 101. Conference Speaker register 104 is strobed by C·X pulses. The output of comparator 103 is connected to gate 119 in combination with CD-1 and W inputs to form the Update Loudest Speaker signal.

A Conference Detected flip-flop 107 has its operate input connected to gate 113 which acts as a decoder for time slot 94 and the absence of the hold bit being on, to produce a CD-1 output which is gated through NAND gate 108 with a Y pulse to provide the input advance signal for Conferee counter 109. Counter 109 is reset in response to a C·X pulse. The output of counter 109 is stored in Temporary Speaker counter register 110 and after being transferred in response to a ULSP signal the information stored therein is passed to Conference Speaker counter register 111 which registers information from register 110 in response to C·X pulses. Outputs from Conference Speaker counter register 111 are compared to outputs from Conferee counter 109 which are connectd to the B and A inputs respectively of comparator 112. When determination is made that the contents of the two registers are equal, it provides a Conference Speaker Detected signal (CSD) to 2:1 steering gate 105. Registers 101, 102 and 104, comparator 103 and gate 105 all handle a data stream which is 8 bits wide. Registers 110 and 111 and comparator 112 have a 4 bit wide data handling capability.

Figure 3:
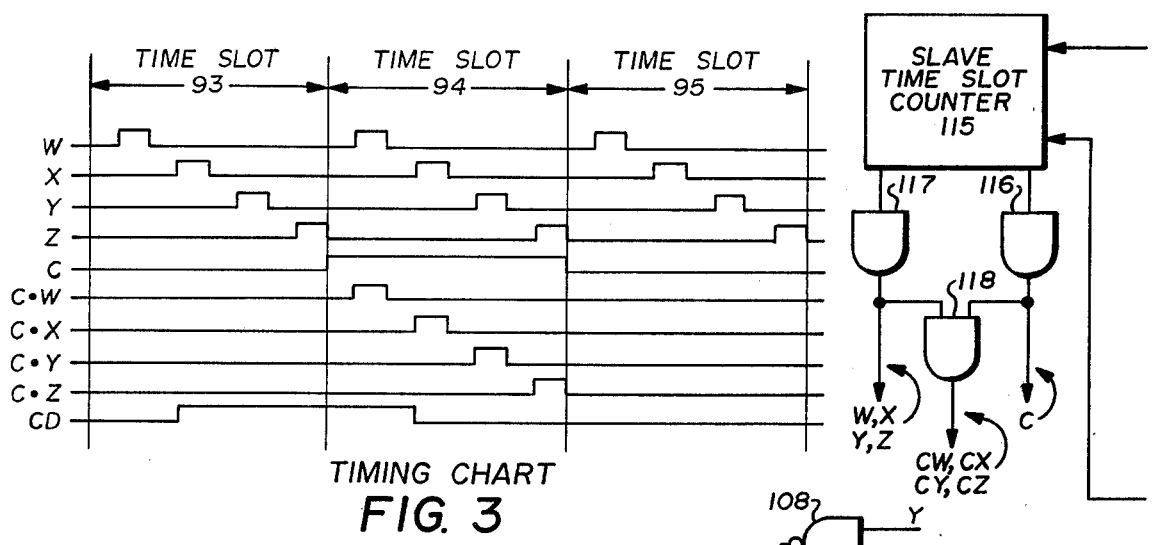
FIG. 3 is a timing chart showing the timing relationship between various pulses and signals employed in the operation of a conference circuit in accordance with the present invention.

Also included in the conference circuit of FIG. 1 is a Slave Time Slot counter 115 which receives input pulses (CK-φ) from the connected switching network and which may be reset in response to Reset-1 pulses from the telephone switching network. Through a logic network including symbolic decoding AND gates 117, 118 and 116; pulses W, X, Y, Z, CW, CX, CY, CZ, and C are generated for advancing the logic circuitry of the conference circuit. The relationship of the pulses derived from the output of counter 115 are shown during time slots 93, 94 and 95 in the timing chart of FIG. 3. They result from the symbolic decoding AND gates which include logic to perform such decodes as anyone skilled in the art might choose.

Referring to FIG. 2 those portions of a switching network of a PABX employing pulse coded modulated transmission techniques and digital switching on a time division basis which interfaces with the conference circuit of the present invention is shown. Such circuitry includes an Information memory 201, a Control A memory 202, a Control B memory 203 and a Channel memory 204. Each memory has a capacity of 768 bits (8×96). Information stored in Information memory 201 is derived from PCM Out Bus-1 which has connections to analog to digital converters such as 225, 227 and 240 and also from digital tone circuitry 229. Control of memory 201 is from Clock source 250 which drives Time Slot counter 209 and inputs to 2:1 steering gate 210 and information gated through 2:1 steering gate 213 whose inputs are connected to Control A memory 202 and Control B memory 203 outputs. The output of steering gate 213 while inputting to steering gate 210 also is provided to the conference circuit. (FIG. 1). Information stored in memory 201 is distributed during X and Y pulses respectively to Speaker A register 215 and Speaker B register 216, both of which include outputs connected to the input of 2:1 steering gate 219.

Speaker B register 216 also has an output connected to the speaker B PCM-1 bus extending to the conference circuit and to cmparator 217. Speaker A register 215 also includes an output to comparator 217. The output of comparator 217 indicates when the information stored in Speaker A register 215 is less than (PAM signal is larger than) the information stored in Speaker B register 216; and is transmitted to register 218. Register 218 which is also controlled by HB-0 and HA-0 signals produces a Speaker B output signal which is used to control gate circuit 219 whose output is connected to 2:1 steering gate 220. Also connected to steering gate 220 is a Conference PCM-0 bus from the conference circuit. Control of gate 220 is via the Force Conference-$\phi$ signal from the conference circuit and a null-$\phi$ signal from NAND gate 221 whose inputs are connected to the HA-1 and HB-1 signals. Outputs from gates 220 are connected to digital to analog circuits 226, 228 and 241. The channel memory 204 is driven by an Early Time Slot counter 207 which is reset early by Decode gate 206 which decodes the Time Slot counter 209. The 2:1 steering gate 208 then drives the Channel memory to allow channel identities stored in it which includes conferee identities to be outputted to the Channel Enable register 214 and then to be distributed to Channel Enable circuits 250, 251 and 252. Pulse amplitude modulated transmission and receive busses provide connections between conference line circuits such as 224, which are gated by channel enable equipment (250) via leads TEN and REN.

Referring now to FIGS. 1 and 2 in combination, the operation being described assumes the switching network of FIG. 2 has been already set up by an associated central processor to allow for a conference of N conferees. The method by which the call has been established is not important and could result from such types of conference applications as progressive, meet me, or attendant (operator) conference. In systems as previously referenced, such determination is all software controlled and results in a network configuration as shown in FIG. 2. The conferees may be served by lines, trunks or might be a PBX attendant or operator.

In the network configuration shown, the conferees equipment identify is stored in the Channel memory 204. This location defines its associated time slot and allows signals stored in register 214 ahead of the channel enabling circuitry to generate, transmit enable (TEN) and receive enable (REN) pulses to a Conferee circuit such as 224. The Control A memory 202 of the same time slot (i.e., same memory word address of the channel memory 204 word with the identity) has the hold bit off and a time slot address of 94. This identifies this time slot as a conference member (conferee). The Control B memory then must have the hold bit also off and its own time slot address. For purposes of the present discussion this will be J for conferee 1 and L for conferee N in the memories of FIG. 2. This allows the Network Speaker B register 216 to contain the pulse code modulation information of each conferee during its own time slot.

At this time the circuitry is ready to provide a conference for N conferees. The heavy lines shown in FIGS. 1 and 2 show the flow of pulse code modulated signals indicative of voice signals over 8 bit parallel paths. All logic functions, registers, etc., included in the above noted path are also 8 bits wide.

Beginning now with the Slave Time Slot counter 115 at a count of 94 which is the conference time slot the following occurs: The contents of the Temporary Speaker register 102 is transferred to the Conference Speaker register 104 and the Temporary Speaker counter register 110 contents are transferred to the Conference Speaker counter register 111 by signal C·X. The Conferee register 101 and the Temporary Speaker register 102 are preset and the Conferee counter 109 is reset by signals C·Z. In the switching network of FIG. 2 the conference time slot receives a null code (since the conference is in group 2 which is the digital tone group) and sends out a null code since pulses HA and HB will be present. The network will now cycle through time slots 95, 96, 0, 1, etc. through J-1.

When time slot J occurs the following events transpire. The network will load the PCM information of conferee 1 into the Information memory 201 at address J. This will occur when pulse W is present. Control Memory A 202 is being read at this time and word J will be decoded to be 94 and the Conferee flip-flop 107 will be set. The Conferee counter 109 then advances to a count of 1 when pulse Y is present. The network will then load a null code or quiet into the Speaker A register 215 during time X and the PCM information for conferee No. 1 will be loaded into the Speaker B register 216 during time Y.

The Speaker B register 216 information will be loaded into the Conferee register 101 during times by signal CD·Z. The network will then compare the Speaker A and Speaker B registers 215 and 216 respectively and choose the information located in the Speaker B register 216 (unless B is equal to null code) and attempt to output this information through the steering gate 219. The Force Conference-$\phi$ signal forces the Conference Speaker register 104 PCM information (this is the PCM information of the preceding frames speaker) through steering gate 105.

The contents of the Conferee register 101 is then compared to the contents of the Temporary Speaker register 102 and will be less, (i.e., A less than B) in binary value based on its greater PAM value. The contents of the Conferee register 101 will then be transferred to the Temporary Speaker register 102 and the Conferee counter 109 count, will be stored in the Temporary Speaker counter register 110. This occurs during the W time pulse of the next time slot since the CD (conference detect signal) goes from X time to X of the next time slot. The Conference Detected flip-flop 107 will reset at time pulse X. If, however, the pulse code modulation information of conferee No. 1 was null code no transfer occurs.

The switching network now counts through a time of L-1. When time slot L then occurs the following transpires: The network will load the PCM information of conferee N into the Information memory 201 at address L during time W. The Control Memory A 202 is available to the decode logic and the Conferee flip-flop 107 will set. The Conferee counter 109 will then advance during time Y and the network will load a null code into the Speaker A register 215 at time X with PCM information of Conferee N into the Speaker B register 216 during the time Y.

The Speaker B register 216 information will then be loaded into the Conferee register 101 during time Z. The network then compares the Speaker A and Speaker B registers 215 and 216 respectively and chooses Speaker B register 216 (again, unless B equals null code) and tries to output it through the steering gate 219. The Force Conference φ signal forces the Conference Speaker register 104 PCM information (of the preceding frame) through the steering gate 220.

The Conferee register 101 information is then compared to the Temporary Speaker register 102 information. If it is less in binary value (greater PAM) it will be updated and become the new Temporary Speaker information. The Conferee counter 109 information will also be transferred. If the information is not less in binary value, no transfer occurs. The transfer is the function of the ULSP (Update Loudest Speaker) signal which occurs during time W. The Conferee Detected flip-flop 107 then resets during time X.

The switching network will then continue to advance through time slot 93. For every conferee encountered an attempt will be made to update the information stored in the Temporary Speaker register. Note that during each time slot which a conferee is detected the previous frames conference PCM is forced through steering gate 220 and a determination is made to see if the Conferee is the speaker of the preceding frame. This is done by comparator 112 which compares the contents of the Conferee counter 109 to the Conference Speaker counter register 111. If they are both equal, the conference PCM information forced through the network steering gate 220 is then switched to null code in the conference steering gate 105. This is done so that the present speaker does not hear himself.

The switching network now reaches time slot 94. At this time pulses C·W, C·X, C·Y and C·Z will sequentially occur. At pulse C·X the Temporary Speaker counter register 110 information becomes the Conference Speaker count for the following frame. The Temporary Speaker register 102 contents (PCM code of the selected conferee) are transferred to the Conference Speaker register 104 and the Temporary Speaker counter register 110 contents (the conference count number) are transferred to the Conference Speaker counter register 111. The Conference register 101 and Temporary Speaker register 102 are preset and the Conferee counter 109 is reset by signal C·Z. In the network the conference time slot 94 receives and sends the null code.

The above cycle continues as outlined above, searching for a new speaker for the following frame. If no conferees exist the Conferee counter 109 will not advance from reset. The Conferee Detected flip-flop 107 will never set so that force conference-φ signal will remain high to the network. The Conferee register 101 and Temporary Speaker register 102 are preset to contain a null code.

If in a switching system like that shown in FIG. 2 the associated conference circuit such as shown in FIG. 1 is removed from the system (being a system option), a pull up resistor 252 on the force conference lead inhibits the conference PCM-φ bus from ever going out. This assumes that the software of the switching system realizes the option is not equipped and will not set up conference network configurations. The present system includes the ability to put individual conferees on hold (inhibited from use of conference circuit) using the Control Memory A hold bit. This arrangement is included in the conference detection logic and will inhibit the Conference Detected flip-flop 107 from setting during this time slot.

While but a single embodiment of the present invention has been shown it will be obvious to those skilled in the art that numerous modifications may be made without departing from the spirit of the present invention which should be limited only by the scope of the claims appended hereto.

What is claimed is:

1. In a pulse code modulated communication system, a plurality of communication channels arranged on a multiplexed basis, a switching system including a memory accessed by said communication channels, and a conference circuit connected to said memory and to said channels, said conference circuit comprising:
   a first register connected to said memory operated to store the coded value of information from each of said channels conducted sequentially through said memory;
   a second register connected to said first register and including output circuit connections to said channels;
   a first comparator circuit connected to said first and to said second registers operated to compare the coded value of information stored in said first and said second registers and in response to determination that the value of information stored in said first register is less than the value of information stored in said second register to cause the coded value of information stored in said first register to be transferred to said second register for transfer of said coded value of information to said channels under control of said switching system.

2. The combination as claimed in claim 1 wherein there is further included:
   a third register connected to said second register and including circuit connections outgoing to said channels;
   said information stored in said second register transferred to said third register in response to a signal from said switching system and said information stored in said third register periodically conducted to said channels in response to signals from said switching system.

3. The combination as claimed in claim 2 wherein there is further included:
   counting means connected to said memory periodically incremented in response to signals from said memory;
   a fourth register connected to said counting means operated to store the count of said counting means;
   a fifth register connected to said fourth register;
   said count stored in said fourth register transferred to said fifth register in response to signals from said switching system;
   gating means connected between said third register and said channels;
   a second comparator circuit connected to said fourth and fifth registers and including a circuit connection to said gating means, operated in response to determination that the count stored in said fourth and fifth registers are equal, to control said gating means to inhibit transfer of information from said third register to said channels.

4. The combination as claimed in claim 3 wherein there is further included a detection circuit connected between said memory and said counting means operated to increment said counting means in response to channel identity information received from said memory.

5. The combination as claimed in claim 3 wherein there is further included a control pulse source connected to said switching system and including output circuit connections to each of said registers, and to said counting means operated in response to periodic clock pulses from said switching system, to generate control pulses and in combination with signals from said memory periodically incrementing said counting means for controlling the storage of information in said first, third and fifth registers and in combination with a determination by said first comparator circuit that the value of information stored in said first register in less than the value of information stored in said second register to control storage of information in said second and fourth registers.

* * * * *